(No Model.) 2 Sheets—Sheet 1.
J. H. SCHNARRENBERGER.
ADDING MACHINE.
No. 439,431. Patented Oct. 28, 1890.
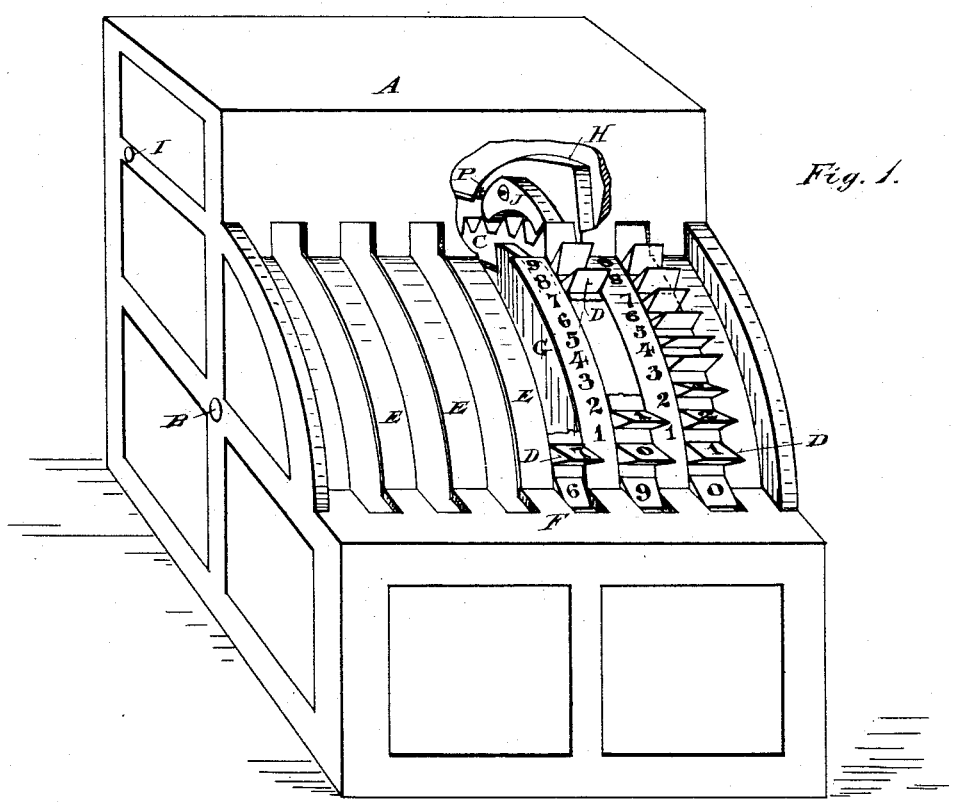
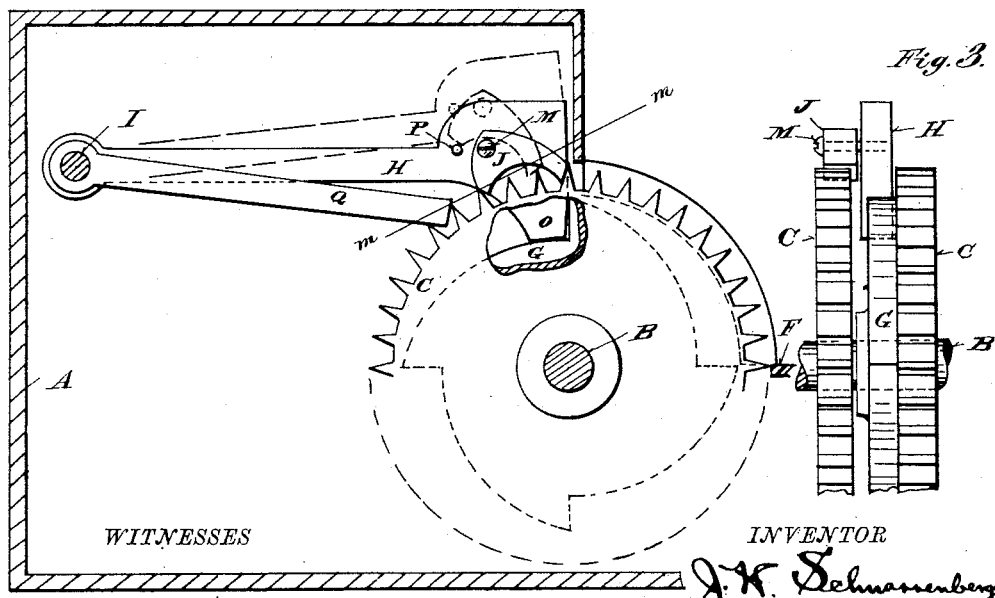
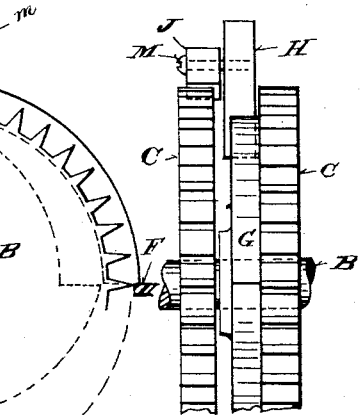

(No Model.) 2 Sheets—Sheet 2.

J. H. SCHNARRENBERGER.
ADDING MACHINE.

No. 439,431. Patented Oct. 28, 1890.

WITNESSES
H. M. Plaisted
Warren Hall

INVENTOR
J. H. Schnarrenberger,
By H. A. Toulmin
his Attorney.

UNITED STATES PATENT OFFICE.

JACOB H. SCHNARRENBERGER, OF SPRINGFIELD, OHIO, ASSIGNOR TO THOMAS REYNOLDS, OF SAME PLACE.

ADDING-MACHINE.

SPECIFICATION forming part of Letters Patent No. 439,431, dated October 28, 1890.

Application filed April 25, 1890. Serial No. 349,448. (No model.)

*To all whom it may concern:*

Be it known that I, JACOB H. SCHNARRENBERGER, a citizen of the United States, residing at Springfield, in the county of Clark and State of Ohio, have invented certain new and useful Improvements in Calculating-Machines, of which the following is a specification, reference being had therein to the accompanying drawings.

My invention relates to certain new and useful improvements in calculating or adding machines.

My improvements have reference to a motion-transmitting mechanism adapted to actuate a series of figure-disks in an ascending order, and have reference to other points of detail hereinafter set forth.

Figure 4:
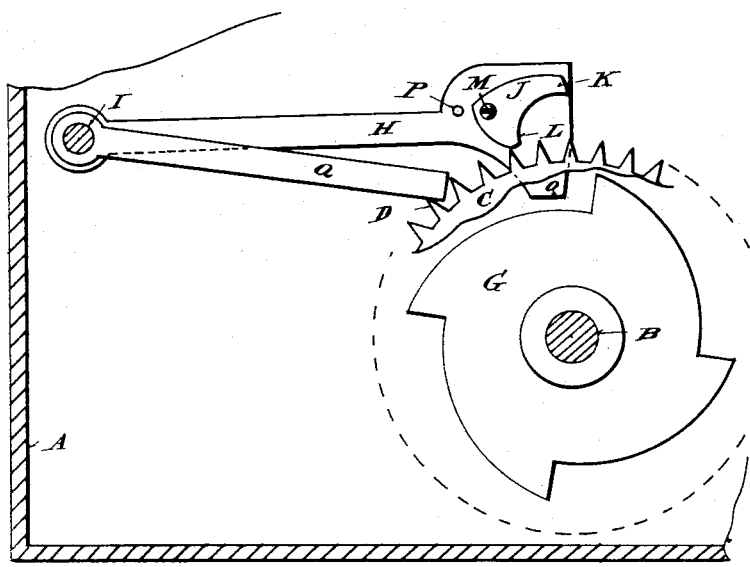
Figure 5:
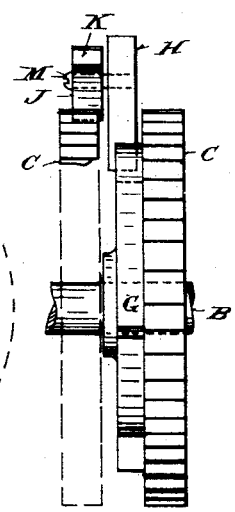

In the accompanying drawings, forming a part of this specification, and on which like reference-letters indicate corresponding parts, Figure 1 represents a perspective view of my calculating-machine having several of the disks removed and a portion of the casing broken away to show one form of actuating arm and pawl; Fig. 2, a longitudinal section alongside of one of the figure-disks, a side view of one detent and actuating-arm with its pawl in its lower position, the upper position thereof being shown by broken lines; Fig. 3, an edge view of a figure-disk, its cam, the actuating-arm operated thereby, and having its pawl engaged with the next figure-disk; Fig. 4, a similar section of Fig. 2, showing the position of the pawl when acted on from its rear end; Fig. 5, an edge view of the same, and Fig. 6 a plan view of my device and a horizontal section of the inclosing-case.

The letter A designates a case, preferably paneled, as shown in Fig. 1, and having a portion of the front in the form of a quadrant, and having slits to receive the figure-disks, now to be described. A shaft extends transversely of the case, and is preferably mounted therein, and carries figure-disks C, revolubly mounted thereon. These disks have teeth or projections D on their peripheries and figures carried on the alternates faces thereof, as shown in Fig. 1. Each disk has preferably forty of these teeth, divided into sets of ten, and each set numbered from 0 to 9, inclusive. One set can therefore be shown complete in the quadrant-faced front of the case, or a portion of one set and the remaining portion of the next set, according to the position of the said figure-disks, as shown in Fig. 1. The curved strips E, forming this quadrant-faced front, are preferably numbered from 1 to 9, beginning at the bottom, and so placed that each figure will be to the left and a little above its corresponding figure on the figure-disk when the figure 0 on the disk is at the reading-line, as shown by the first disk on the right in Fig. 1.

The front portion F of the case serves as a finger-board, from which the required figure is read. Each disk is turned down and forward by inserting the finger between the teeth at the desired figure on the tooth D. Each time that the tooth carrying the 0 arrives at the finger-board the next disk in the ascending order will be actuated by the mechanism hereinafter described, so as to move the next higher figure to the finger-board. For instance, the first disk on the right has just moved the next disk so as to present 9 instead of 8 at the finger-board. If this first disk be now revolved, it will not actuate the second disk until the figure 0 in the next set of the first disk arrives at the finger-board, when the next higher figure on the second disk (the figure 0 in this case) will be moved down and take the place of 9, at the same time actuating the third disk to present the next higher figure than it showed before. By the hereinafter-described mechanism every time the figure 0 on any disk arrives at the finger-board it will change the next disk to the left, so as to move the next higher number on that disk to the finger-board or reading-line.

Figure 6:
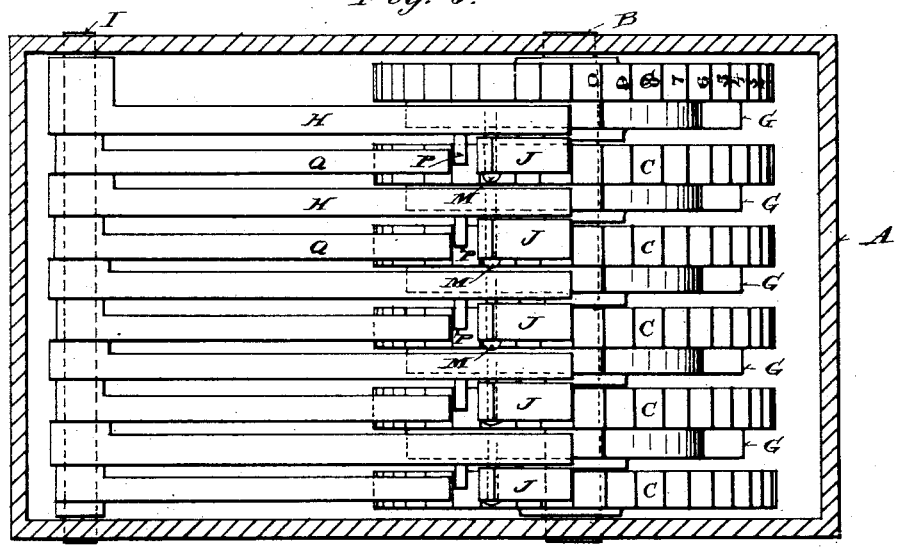

A cam G having four teeth is secured or formed integrally on the left side of each disk, except the one to the extreme left of the series, as shown in Fig. 6. The teeth of these cams have curved front sides and radial back sides, the said radial sides being opposite the tooth carrying the figure 0 of each set on its respective disk. An abrupt change of contour is formed by this radial face, as shown by the outline of the cam in Figs. 2 and 4.

This cam raises and lowers a connecting or motion transmitting mechanism between its disk and the one to the left, respectively. This connecting mechanism transmits the motion through from one disk to the other in a series, and forms the motion-transmitting mechanism, now to be described.

The motion-transmitting mechanism consists of a series of actuating-pieces, each preferably in the form of an arm H, pivoted to the rod I, carried by the said case and extending transversely across the same. Each arm carries a pawl J, having a front face K, adapted to engage the teeth of its respective disk, and the heel L of each pawl is also adapted to be engaged with said teeth. This pawl is pivoted at M, preferably out of a direct line between the said front and rear faces K and L. The front portion is heavier than the rear portion, and it will therefore assume the position shown by broken lines in Fig. 2, when the said arm H is elevated by the action of the curved surface of the said cam bearing against the portion O on the said arm H. This position brings the front end in engagement with the next tooth to the rear, as shown in Fig. 2. A stop P may be used to prevent the pawl from dropping too far to the rear and thus taking more than one tooth at a time. The weight of the actuating-arm bearing on the next disk to the left by the pawl, as shown by the broken lines in Fig. 2, will cause said disk to move forward one division or tooth as the arm descends by dropping over the radial face of the cam. The impulse thereby given to the disk is checked by the heel of the pawl, as shown in Fig. 2 by full lines, and thus the division is moved but one division at a time. The return of the disk in a backward direction is prevented by the detent Q engaging with the teeth at one end to prevent said returning action, and preferably pivoted on the same rod I on which the actuating-arms are mounted. Thus the connecting or motion-transmitting mechanism from one figure-disk to the next one to the left consists of an actuating arm or other piece adapted to carry a pawl which engages with the next disk to the left and operates the same by gravity or otherwise when the said arm is raised and lowered by a cam carried by the first disk to the right of said arm. The detent Q may or may not be used, since it only serves as a safety-check to prevent the backward turn of its figure-disk. Thus it will be seen that this motion-transmitting mechanism may be arranged in series connecting one disk to the next in an ascending order, as shown in Fig. 6. The first disk on the right may represent units, the next to the left of it tens, the next hundreds, and so on. In calculating dollars and cents, for instance, the first and second disks may represent cents and the third and others to the left of it may represent dollars.

It will be seen from Fig. 4 that the heel portion of the pawl J does not act as an absolute catch to prevent the forward movement of its figure-disk, but serves only as a check. When the pawl engages its disk, as shown by the full lines in Fig. 2, and a forward movement of the disk is caused by actuating it by hand, the pawl will be raised up to the position shown in Fig. 4 as the tooth engaging its heel portion is brought forward, because the said center M lies above or out of the line of action m m of the tooth engaging said heel portion. However, the curved surface of the cam will raise the actuating-arm as the disk is rotated forward, and the pawl and arm will assume the position ready for action, as shown by the broken lines in Fig. 2, before the portion O of the said arm arrives at the radial surface of the cam. Thus it will be seen that each figure-disk may be moved forward by hand independently of the others without destroying the correct action of the mechanism. If necessary, additional weight may be given to the outer end of the said actuating-arm to cause the said arm to have the normal tendency toward the figure-disk, which causes the forward movement of the said disk.

It has been found that four sets of divisions on each figure-disk is a convenient number, since a quadrant exposes to view and easy access the cipher and the nine integers, whether in one set or two. If the figures on the disk are distributed over half of a circle, it would be necessary to expose half of the disk and to reach over to the back side of the machine in order to find a higher number in the set. I do not wish, however, to limit myself to any particular form or construction of the disks and motion-transmitting mechanism, but claim, broadly, an actuating arm or piece provided with a pawl thereon and having a normal tendency toward the figure-disk. Thus it will be seen that when the 0 on each figure-disk arrives at the finger-board the actuating-arm H, having been raised by the curved cam-surface, drops over the radial face thereof, and by means of the pawl carried by said arm and the normal tendency of said arm toward the figure-disk the next disk to the left will be moved forward one tooth, thus displacing the number at the finger-board by the next higher number on that disk.

The peculiar advantage of my motion-transmitting mechanism is that it requires no springs or other means than gravity to cause the normal tendency of the said actuating-piece toward the figure-disk which it actuates. By this simple arrangement of the parts an effective device is formed which is not likely to get out of order or to be easily broken or worn out by constant usage.

While this machine is especially adapted to be used as an adding-machine, it may be used for other calculations—such as multiplications, subtraction, and division—by the same mechanism as already described, according to certain rules adapted to each of these branches of calculation.

Having thus fully described my invention, what I claim as new, and desire to secure by Letters Patent, is—

In a calculating-machine, the combination, with figure-disks having cams, of a series of actuating-arms operated by said cams and having a normal tendency toward said disks, a pawl having a front and a heel portion adapted to actuate and to check the disks to the left of the arm on which it is mounted, and a detent for each of said disks to prevent the backward rotation thereof.

In testimony whereof I affix my signature in presence of two witnesses.

JACOB H. SCHNARRENBERGER.

Witnesses:
OLIVER H. MILLER,
WARREN HULL.